(12) United States Patent
Chen

(10) Patent No.: US 7,663,686 B2
(45) Date of Patent: Feb. 16, 2010

(54) LENS MODULE AND CAMERA EMPLOYING THE SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 478 days.

(21) Appl. No.: 11/556,398

(22) Filed: Nov. 3, 2006

(65) Prior Publication Data
US 2007/0285555 A1    Dec. 13, 2007

(30) Foreign Application Priority Data
Jun. 9, 2006    (CN) .................. 2006 1 0061085

(51) Int. Cl.
  H04N 5/225    (2006.01)
  F21V 9/04    (2006.01)
  G03B 17/00    (2006.01)
(52) U.S. Cl. ............... 348/335; 359/359; 396/529
(58) Field of Classification Search ........... 348/335, 348/340, 373, 374; 359/708, 716, 738, 791; 396/529, 532, 533
See application file for complete search history.

(56) References Cited

U.S. PATENT DOCUMENTS

| 6,172,813 | B1 * | 1/2001 | Tadic-Galeb et al. | 359/618 |
| 6,898,030 | B1 * | 5/2005 | Lin et al. | 359/819 |
| 7,095,571 | B2 | 8/2006 | Lee | |
| 7,367,724 | B2 * | 5/2008 | Matsushita et al. | 396/529 |
| 2003/0193605 | A1 * | 10/2003 | Yamaguchi | 348/335 |
| 2006/0055820 | A1 * | 3/2006 | Lyon et al. | 348/373 |
| 2006/0082681 | A1 * | 4/2006 | Minarik et al. | 348/373 |

FOREIGN PATENT DOCUMENTS

| CN | 1614450 A | 5/2005 |
| CN | 2731480 Y | 10/2005 |

* cited by examiner

Primary Examiner—Nhan T Tran
Assistant Examiner—Trung Diep
(74) Attorney, Agent, or Firm—Clifford O. Chi

(57) ABSTRACT

A lens module includes a barrel defining a through hole, at least one plastic lens accommodated in the through hole and a UV/IR cut filter mounted on the barrel and configured for preventing entry of both UV light and IR light into the barrel. The lens module has a UV/IR cut filter mounted on the barrel configured for preventing entry of both UV light and IR light into the barrel, so it can prevent UV light damaging plastic lenses, and accordingly can improve the useful life of the lens module.

19 Claims, 1 Drawing Sheet

LENS MODULE AND CAMERA EMPLOYING THE SAME

BACKGROUND

1. Field of the Invention

The present invention relates to lens modules and cameras and, more particularly, to a lens module that can prevent a plastic lens therein from being affected by ultraviolet light, and a camera employing the lens module.

2. Description of Related Art

Generally, image pick-up devices such as charge coupled devices (CCD) or complementary metal oxide semiconductors (CMOS) used in, for example, cameras, react to light even in the near-infrared region beginning at a wavelength of about 700 nm and in the infrared (IR) region. However, light in the near-infrared and IR regions causes crosstalk that reduces a signal-to-noise ratio of an image pick-up device and thereby deteriorating the device's reproduction ability. In order to prevent such reaction and crosstalk, IR cut filters that block light in the near-infrared and IR regions are assembled in lens modules implemented in conventional cameras.

However, in a conventional lens module, the IR cut filter usually is assembled as the last part for the lens module by using ultraviolet (UV) glue on a spacer. The use of UV glue has adhesion and reliability problems. Also, a plastic lens in the lens module may be affected by UV light in sunlight, or by UV light used in UV curing processes. Many plastic lenses turn yellow with long-term exposure to UV light.

What is needed, therefore, is a lens module which can prevent plastic lenses from being affected by UV light.

SUMMARY OF INVENTION

In accordance with one embodiment, a lens module includes a barrel defining a through hole, at least one plastic lens accommodated in the through hole and a UV/IR cut filter mounted on the barrel and configured (i.e., structured and arranged) for preventing entry of both UV light and IR light into the barrel.

In accordance with an embodiment, a camera includes a lens module and an imaging module. The lens module includes a barrel defining a through hole, at least one plastic lens accommodated in the through hole and a UV/IR cut filter mounted on the barrel and configured for preventing entry of both UV light and IR light into the barrel. The imaging module is coupled to the lens module, and includes a holder and an image sensor received in the holder.

Other advantages and novel features will become more apparent from the following detailed description of present lens module and camera, when taken in conjunction with the accompanying drawing.

BRIEF DESCRIPTION OF THE DRAWING

Many aspects of the present lens module and camera can be better understood with reference to the following drawing. The components in the drawing are not necessarily drawn to scale, the emphasis instead being placed upon clearly illustrating the principles of the present lens module and camera. Moreover, in the drawing, like reference numerals designate corresponding parts.

DETAILED DESCRIPTION

Figure 1:
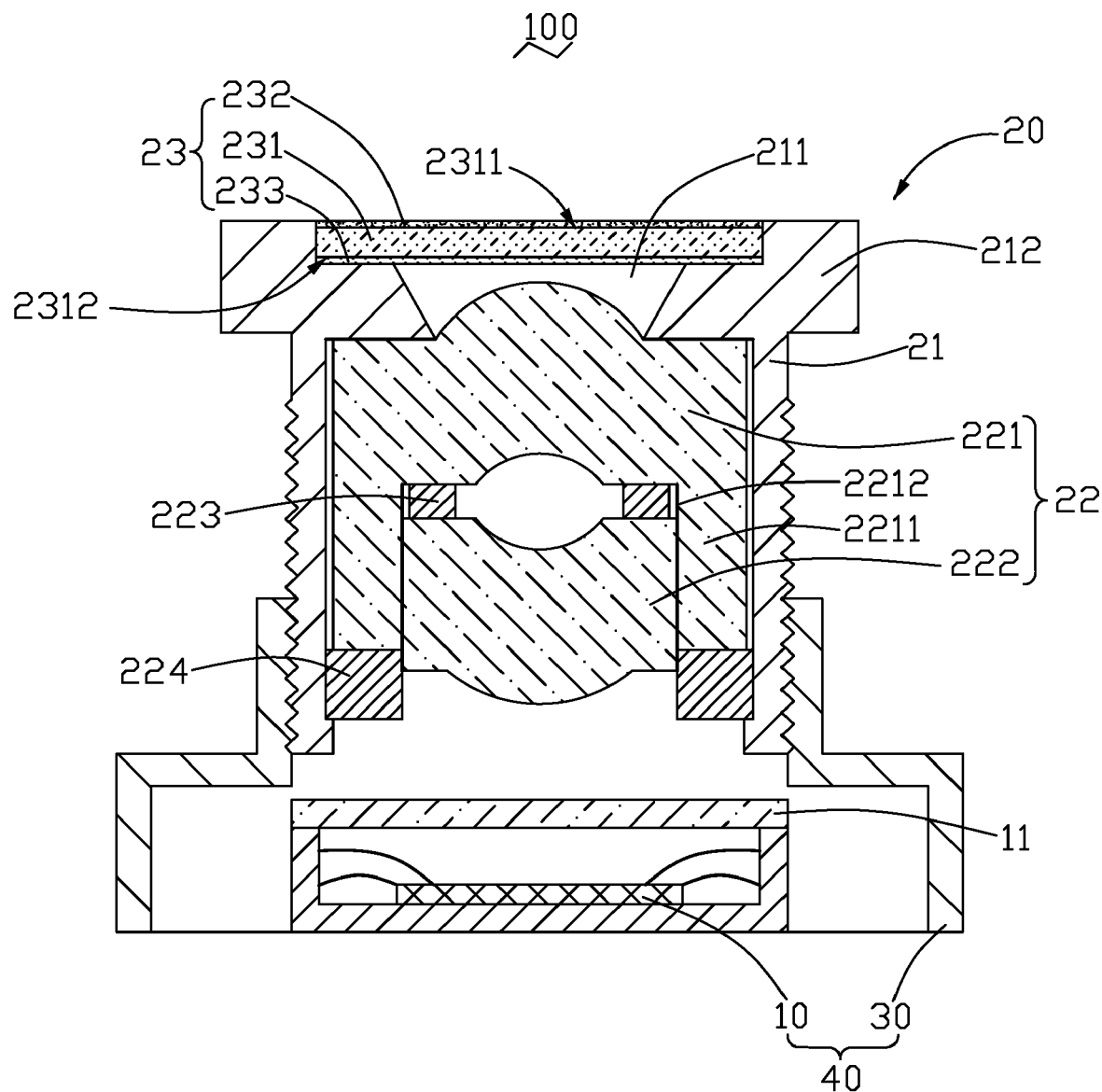
FIG. 1 is a schematic, cross-section view of a camera according to an embodiment of the present invention.

Embodiments of the present lens module and camera employing the lens module will now be described in detail below and with reference to the drawing.

Referring to FIG. 1, a camera 100 according to an embodiment includes a lens module 20 and an imaging module 40 coupled to the lens module 20. The imaging module 40 includes a holder 30 and an image sensor 10 received in the holder 30.

The image sensor 10 is configured for connecting to a circuit board and can convert optical signals to image signals. The image sensor 10 can be a CCD or a CMOS. Preferably, the image sensor 10 is packaged in a ceramic leaded chip carrier (CLCC), plastic laded chip carrier (PLCC) or chip scale package (CSP). A glass cover 11 is disposed on the top of image sensor 10 in order to avoid contamination.

The lens module 20 is coupled to the imaging module 40. In order that a distance between the lens module 20 and the image sensor 10 received in the holder 30 can be changed for focusing, preferably, the lens module 20 is engaged with the holder 30 by cam structure or thread structure. In present embodiment, the lens module 20 is threadedly engaged with the holder 30.

The lens module 20 includes a barrel 21 defining a through hole 211, at least one lens group 22 accommodated in the through hole 211 and a UV/IR cut filter 23 mounted on the barrel 21.

The barrel 21 can be made of a material selected from the group consisting of polycarbonate, acrylonitrile-butadiene-styrene, and any combinations thereof. The barrel 21 can also have a focus adjusting ring 212 arranged at one end thereof with the UV/IR cut filter 23 mounted thereon. Preferably, the focus adjusting ring 212 is integrally formed with the barrel 21.

In present embodiment, the lens module 20 only has one lens group 22. In order from the object side, the lens group 22 includes a first lens 221 and a second lens 222 with same optical axis. At least one of the first lens 221 and the second lens 222 is a plastic lens. The first lens 221 has a peripheral annular wall 2211 defining a cavity 2212, so that the second lens 222 can be inserted inside the cavity 2212 and surrounded by the peripheral annular wall 2211 to achieve a close-fit with the first lens 221. Both the first lens 221 and the second lens 222 have anti-reflection coatings coated on the two surfaces intersecting with the optical axis. Preferably, the anti-reflection coating has transmittance more than 92% for the wavelength from 400 nm to 700 nm. A first spacer 223 is arranged between the first lens 221 and the second lens 222 and a second spacer 224 is arranged between the second lens 222 and the barrel 21. Both the first spacer 223 and the second spacer 224 are made of dark polymer material to avoid multi-reflection, flare, and ghost images.

The UV/IR cut filter 23 configured for preventing entry of both UV light and IR light into the barrel 21 and damaging plastic lens and image sensor 10. The UV/IR cut filter 23 includes a UV/IR cut filter film 232 and a transparent board 231 with a first surface 2311 and an opposite second surface 2312. The UV/IR cut filter film 232 can be formed on one of the first surface 2311 and the second surface 2312 or on both the first surface 2311 and the second surface 2312. In present embodiment, the transparent board 231 is a glass board with the UV/IR cut filter film 232 formed on the first surface 2311 and an anti-reflection coating 233 on the second surface 2312 to ensure the transmittance of approximately more than 92% of incident visible light. Preferably the UV/IR cut filter 23 should allow transmittance of visible light in an approximate range from 95% to 99.8%.

The UV/IR cut filter film 232 is a film stack. The film stack includes a plurality of high refractive index layers and a plurality of low refractive index layers alternately stacked one on another, wherein the film stack is represented as follows:

$$(3.5H3.5L)^7(2.5H2.5L)^7(HL)^6(0.76H0.76L)^6$$

wherein H represents a high refractive index layer having a base optical thickness equal to one fourth of a reference wavelength associated with the filter, L represents a low refractive index layer having a base optical thickness equal to one fourth of a reference wavelength associated with the filter, the expression enclosed in each parenthesis represents a filter cavity, and the superscript represents the number of repetitions of the expression enclosed in that parenthesis. The high refractive index material has a refractive index in an approximate range from 2.0 to 2.3 and can selected from a group consisting of $Ti_3O_5$, $TiO_3$, $TiO_2$, $Ta_2O_5$, and any mixtures thereof. The low refractive index material has a refractive index in an approximate range from 1.4 to 1.6 and can selected from a group consisting of $SiO_2$, $Al_2O_3$, AlN, and any mixtures thereof. In present embodiment, the high refractive index material is $TiO_2$ and the low refractive index material is $SiO_2$. Preferably, the UV/IR cut filter film 232 has a transmittance of UV light with wavelength in an approximate range from 200 nm to 350 nm less than 1% and a transmittance of IR light with wavelength in an approximate range from 700 nm to 1100 nm less than 1%.

As stated above, the lens module and the camera employing the lens module have a UV/IR cut filter mounted on the barrel and configured for preventing entry of both UV light and IR light into the barrel and thus prevents UV light damage to plastic lenses, and accordingly, can improve the use life of the lens module and the camera employing the lens module.

It is understood that the above-described embodiments are intended to illustrate rather than limit the invention. Variations may be made to the embodiment without departing from the spirit of the invention. Accordingly, it is appropriate that the appended claims be construed broadly and in a manner consistent with the scope of the invention.

What is claimed is:

1. A lens module, comprising:
a barrel defining a through hole;
at least one plastic lens accommodated in the through hole; and
a UV/IR cut filter mounted on the barrel and configured for preventing entry of both UV light and IR light into the barrel;
wherein, the UV/IR cut filter comprises a UV/IR cut filter film which is a film stack, the film stack comprising a plurality of high refractive index layers and a plurality of low refractive index layers alternately stacked one on another, wherein the film stack is represented as follows:

$$(3.5H3.5L)^7(2.5H2.5L)^7(HL)^6(0.76H0.76L)^6,$$

wherein H represents a high refractive index layer having a base optical thickness equal to one fourth of a reference wavelength associated with the UV/IR cut filter, L represents a low refractive index layer having a base optical thickness equal to one fourth of the reference wavelength associated with the UV/IR cut filter, the expression enclosed in each pair of parentheses represents a filter cavity, and each superscript represents the number of repetitions of the expression enclosed in that pair of parentheses.

2. The lens module as claimed in claim 1, wherein the barrel has a focus adjusting ring arranged at one end thereof with the UV/IR cut filter mounted thereon.

3. The lens module as claimed in claim 2, wherein the focus adjusting ring is integrally formed with the barrel.

4. The lens module as claimed in claim 1, wherein the lens module comprises a first lens and a second lens, the first lens having a peripheral annular wall surrounding the second lens therein.

5. The lens module as claimed in claim 4, further comprising at least one spacer arranged between the first lens and the second lens.

6. The lens module as claimed in claim 1, wherein the UV/IR cut filter further comprises a transparent substrate and an anti-reflection coating, the transparent substrate has a first surface and an opposite second surface, the UV/IR cut filter film is formed on the first surface, and the anti-reflection coating is formed on the second surface.

7. The lens module as claimed in claim 6, wherein the second surface of the transparent substrate faces the at least one plastic lens.

8. The lens module as claimed in claim 1, wherein material of the high refractive index layers is selected from a group consisting of $Ti_3O_5$, $TiO_3$, $TiO_2$, $Ta_2O_5$, and any mixtures thereof.

9. The lens module as claimed in claim 1, wherein material of the low refractive index layers is selected from a group consisting of $SiO_2$, $Al_2O_3$, AlN, and any mixtures thereof.

10. A camera, comprising:
a lens module comprising:
a barrel defining a through hole;
at least one plastic lens accommodated in the through hole; and
a UV/IR cut filter mounted on the barrel and configured for preventing entry of both UV light and IR light into the barrel; and
an imaging module coupled to the lens module, the imaging module comprising:
a holder; and
an image sensor received in the holder,
wherein, the UV/IR cut filter comprises a UV/IR cut filter film which is a film stack, the film stack comprising a plurality of high refractive index layers and a plurality of low refractive index layers alternately stacked one on another, wherein the film stack is represented as follows:

$$(3.5H3.5L)^7(2.5H2.5L)^7(HL)^6(0.76H0.76L)^6,$$

wherein H represents a high refractive index layer having a base optical thickness equal to one fourth of a reference wavelength associated with the UV/IR cut filter, L represents a low refractive index layer having a base optical thickness equal to one fourth of the reference wavelength associated with the UV/IR cut filter, the expression enclosed in each pair of parentheses represents a filter cavity, and each superscript represents the number of repetitions of the expression enclosed in that pair of parentheses.

11. The camera as claimed in claim 10, wherein the barrel is threadedly engaged with the holder.

12. The camera as claimed in claim 10, wherein the image sensor is a charge coupled device (CCD) or a complementary metal oxide semiconductor (CMOS).

13. The camera as claimed in claim 10, wherein the barrel has a focus adjusting ring arranged at one end thereof with the UV/IR cut filter mounted thereon.

14. The camera as claimed in claim 13, wherein the focus adjusting ring is integrally formed with the barrel.

15. The camera as claimed in claim 10, wherein the lens module comprises a first lens and a second lens, the first lens having a peripheral annular wall surrounding the second lens therein.

16. The camera as claimed in claim 15, further comprising at least one spacer arranged between the first lens and the second lens.

17. The camera as claimed in claim 10, wherein the UV/IR cut filter further comprises a transparent substrate and an anti-reflection coating, the transparent substrate has a first surface and an opposite second surface, the UV/IR cut filter film is formed on the first surface, and the anti-reflection coating is formed on the second surface.

18. The camera as claimed in claim 10, wherein material of the high refractive index layers is selected from a group consisting of $Ti_3O_5$, $TiO_3$, $TiO_2$, $Ta_2O_5$, and any mixtures thereof.

19. The camera as claimed in claim 10, wherein material of the low refractive index layers is selected from a group consisting of $SiO_2$, $Al_2O_3$, $AlN$, and any mixtures thereof.

\* \* \* \* \*

UNITED STATES PATENT AND TRADEMARK OFFICE
CERTIFICATE OF CORRECTION

PATENT NO. : 7,663,686 B2 Page 1 of 1
APPLICATION NO. : 11/556398
DATED : February 16, 2010
INVENTOR(S) : Ga-Lane Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Thirtieth Day of November, 2010

David J. Kappos
*Director of the United States Patent and Trademark Office*